United States Patent
Power, II et al.

(10) Patent No.: US 12,419,392 B1
(45) Date of Patent: Sep. 23, 2025

(54) CONNECTION ASSEMBLY FOR RELEASABLY COUPLING A FIRST ARTICLE TO A SECOND ARTICLE AND METHOD THEREFOR

(71) Applicant: Tethrd LLC, Columbia, TN (US)

(72) Inventors: Walter Ernest Power, II, Columbia, TN (US); Gregory Alan Godfrey, Richmond Hill, GA (US); Carl Eugene Kossuth, III, Rolla, MO (US); Shawn Paul Chadwick, Merrill, WI (US)

( * ) Notice: Subject to any disclaimer, the term of this patent is extended or adjusted under 35 U.S.C. 154(b) by 0 days.

(21) Appl. No.: 19/053,804

(22) Filed: Feb. 14, 2025

Related U.S. Application Data (63) Continuation-in-part of application No. 18/769,005, filed on Jul. 10, 2024, now Pat. No. 12,245,666.

(51) Int. Cl.
| | |
|---|---|
| *A44B 1/28* | (2006.01) |
| *A01M 31/02* | (2006.01) |
| *A44B 1/06* | (2006.01) |
| *A44B 1/38* | (2006.01) |
| *A45F 5/00* | (2006.01) |

(52) U.S. Cl.
CPC ............ *A44B 1/28* (2013.01); *A01M 31/025* (2013.01); *A44B 1/06* (2013.01); *A44B 1/38* (2013.01); *A45F 2005/002* (2013.01)

(58) Field of Classification Search
CPC ................. A45F 2005/002; A45F 5/02; A45C 2013/306; A45C 13/30; A44B 11/2592; A44B 1/06
USPC ............................................. 224/575; 24/265
See application file for complete search history.

(56) References Cited

U.S. PATENT DOCUMENTS

| | | | |
|---|---|---|---|
| 10,080,423 B1 * | 9/2018 | Bandlow | A44B 18/0073 |
| 10,667,598 B1 * | 6/2020 | Evans | A45C 13/30 |
| 12,245,666 B1 * | 3/2025 | Power, II | A44B 11/2592 |

* cited by examiner

*Primary Examiner* — Adam J Waggenspack

(57) ABSTRACT

A connection assembly includes a first attachment strap, a first mating assembly, a second attachment strap, a second mating assembly, and a tool key, which connection assembly is used to releasable couple a first article to a second article. The first attachment strap is inserted through a loop in the first article then folded around the loop. The first mating assembly is positioned on opposing ends of the first attachment strap. The second attachment strap is inserted through a loop in the second article and then folded around the loop. The second mating assembly is positioned on opposing ends of the second attachment strap. The tool key is used to rotate a rotatable portion of each of the first mating assembly and the second mating assembly to secure them in place on their respective attachment straps. The first and second mating assemblies are then releasably coupled together.

12 Claims, 13 Drawing Sheets

CONNECTION ASSEMBLY FOR RELEASABLY COUPLING A FIRST ARTICLE TO A SECOND ARTICLE AND METHOD THEREFOR

CROSS-REFERENCE TO RELATED APPLICATIONS

This application is a continuation-in-part (CIP) of pending U.S. patent application Ser. No. 18/769,005, filed Jul. 20, 2024, which is incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to connection systems and devices, such as for securing gear and clothing, and more particularly pertains to a new connection assembly for releasably coupling a first article to a second article. The connection assembly of the present application allows users to quickly and securely connect and disconnect two articles as desired in a secure manner, and allows users to customize the placement of the attachment structures to vary the arrangement of two connected articles.

(2) Description of Related Art Including Information Disclosed Under 37 CFR 1.97 and 1.98

The prior art relates to connection systems and devices, and, as best understood, does not disclose a connection assembly for releasably coupling a first article with a second article that includes a first attachment and a second attachment, wherein the first attachment includes a first strap, a first panel, a first mating member, and a first loop, and the second attachment includes a second strap, a second panel, a second mating member, and a second loop, which connection assembly allows users to quickly and securely connect and disconnect the first article and the second article as desired in a secure manner, and allows user to customize the placement of the attachment structures to vary the arrangement of the first article with respect to the second article, as disclosed and described in at least one possible embodiment herein.

BRIEF SUMMARY OF THE INVENTION

An embodiment of the disclosure meets the needs presented above in a connection assembly that includes a first attachment and a second attachment. The first attachment includes a first strap, a first panel, a first mating member, and a first loop, and the second attachment includes a second strap, a second panel, a second mating member, and a second loop. The first strap has a first end and a second end. The first panel is attached to the first strap adjacent to the first end of the first strap. The first panel is designed to releasably extend through a slot positioned on the first article. The first mating member is attached to the first strap. The first loop is attached to the first strap, wherein the first panel is extendable through the first loop to retain the first panel and first mating member in a static position relative to each other on the first article. The second strap has a first end and a second end. The second panel is attached to the second strap adjacent to the first end of the second strap. The second panel is designed to releasably extend through a slot positioned on the second article. The second mating member is removably coupled to the first mating member. The second mating member is attached to the second strap. The second loop is attached to the second strap, wherein the second panel is extendable through the second loop to retain the second panel and the second mating member in a static position relative to each other on the second article.

An embodiment of the disclosure also relates to a method of releasably coupling a first article to a second article, which method includes the steps of: inserting a first attachment strap through a loop in a first article, folding the first attachment strap around a section of the loop in the first article, positioning a first mating assembly on opposing ends of the first attachment strap, rotating a rotatable portion of the first mating assembly with a tool key to secure the first mating assembly to the opposing ends of the first attachment strap, inserting a second attachment strap through a loop in a second article, folding the second attachment strap around a section of the loop in the second article, positioning a second mating assembly on opposing ends of the second attachment strap, rotating a rotatable portion of the second mating assembly with the tool key to secure the second mating assembly to the opposing ends of the second attachment strap, and releasably coupling the first mating assembly and the second mating assembly.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 7 thereof, a new connection assembly embodying the principles and concepts of an embodiment of the disclosure and generally designated by the reference numeral 10 will be described. A second embodiment of the connection assembly and use thereof is shown in FIGS. 8 to 18. The second embodiment is generally designated by the reference numeral 80 and is further described herein below.

Figure 5:
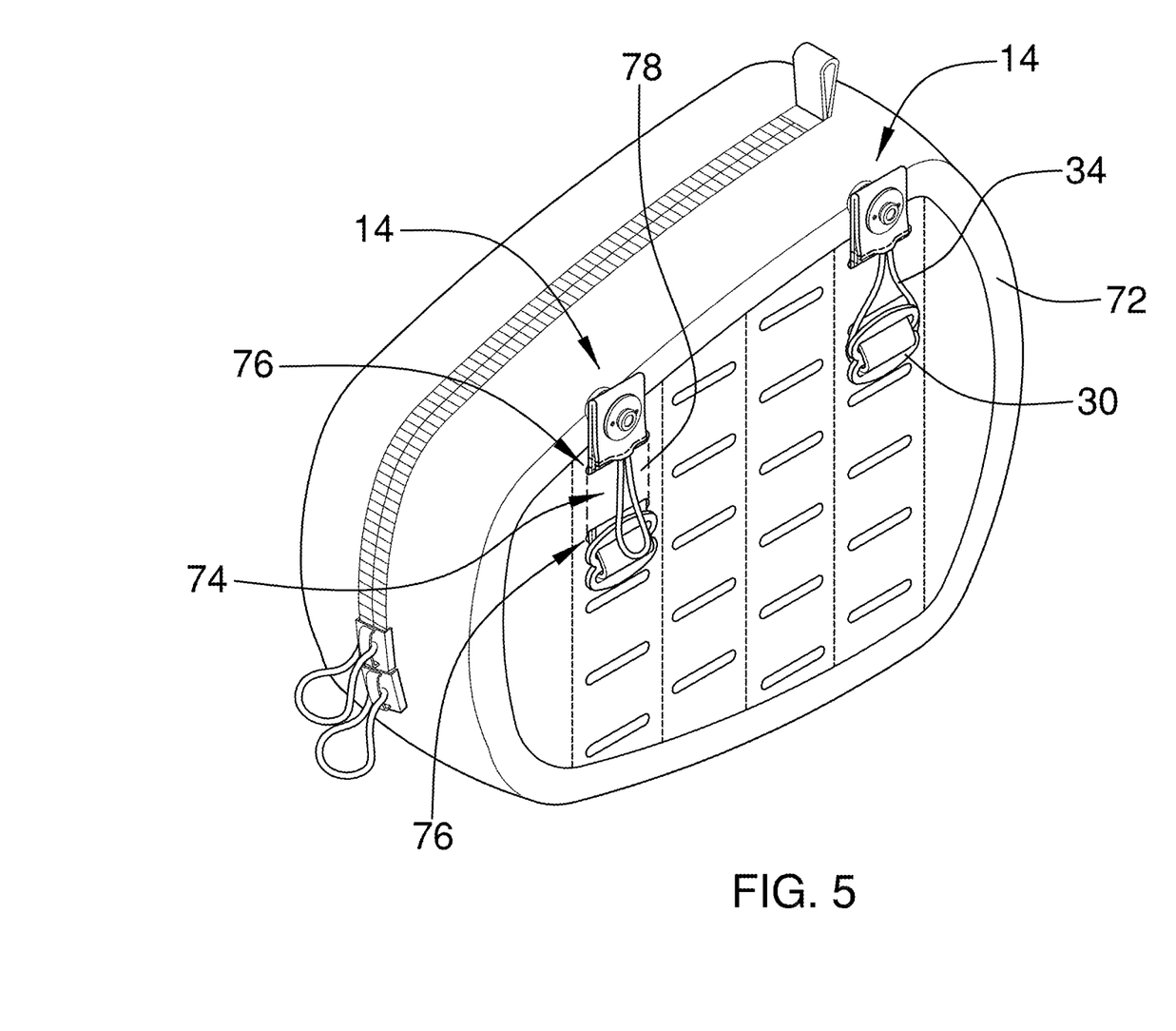
FIG. 5 is a perspective view of an embodiment of the disclosure in use.
Figure 6:
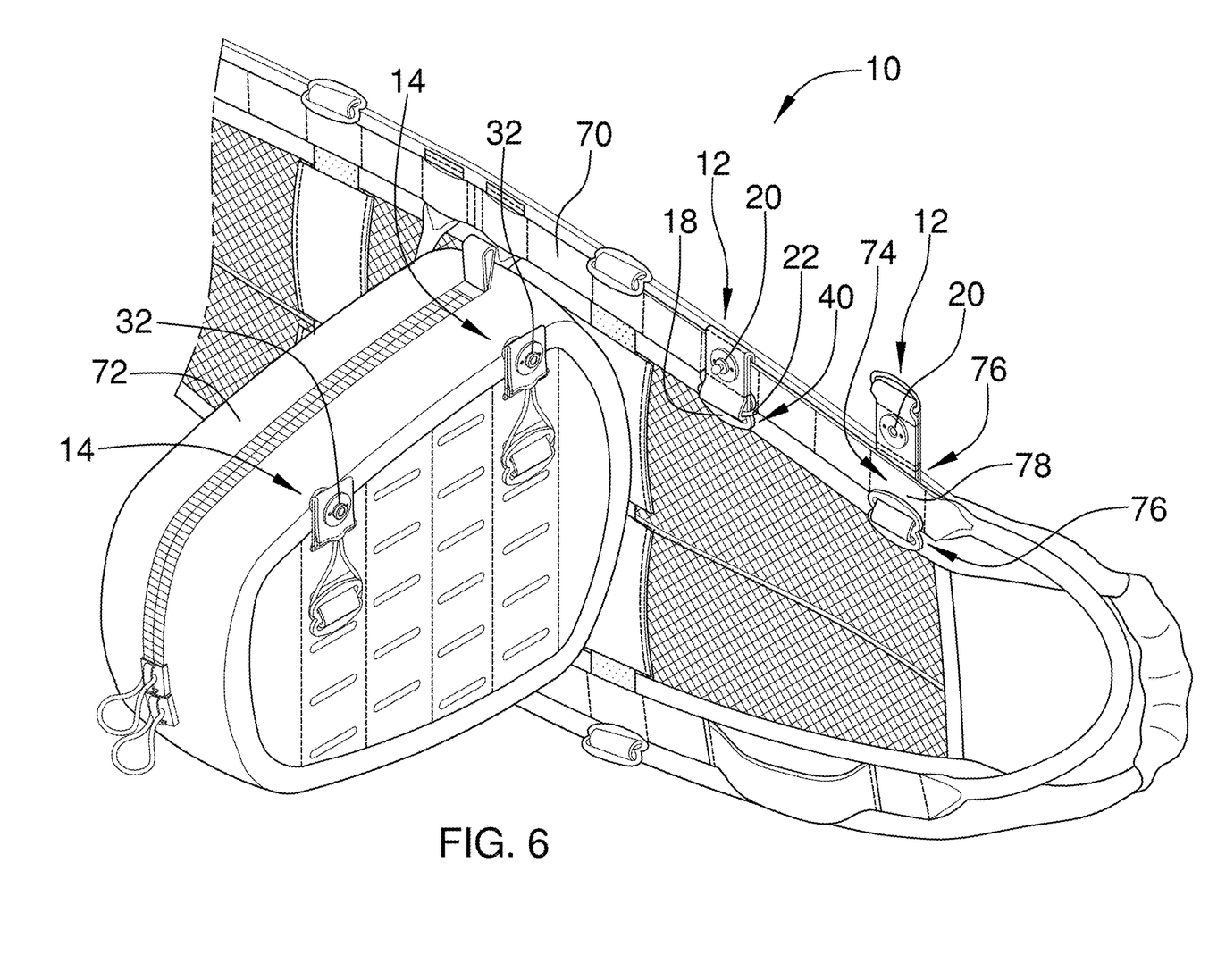
FIG. 6 is a perspective view of an embodiment of the disclosure in use.

As shown in FIGS. 5 and 6, the connection assembly 10 is used for releasably coupling a first article 70 to or with a second article 72. Before discussing the connection assembly 10 in greater detail, it should be noted that FIGS. 5 and 6 show one possible use of the connection assembly 10 and should not be considered as limiting the claims or the disclosure to only this use. In the example shown, the first article 70 is in the form of a saddle used in saddle hunting, and the second article 72 is in the form of a pouch that can be detachably connected to the saddle. However, the first article 70 and the second article 72 as mentioned in the disclosure or the claims are not limited to these examples. Therefore, any reference in the specification or claims to a "first article" or a "second article" should be understood as referring to any type of articles, such as, but not limited to, devices, tools, packs, containers, equipment, gear, and clothing, that could be releasably coupled together by the connection assembly 10, and not merely the possible examples shown in FIGS. 5 and 6.

Figure 1:
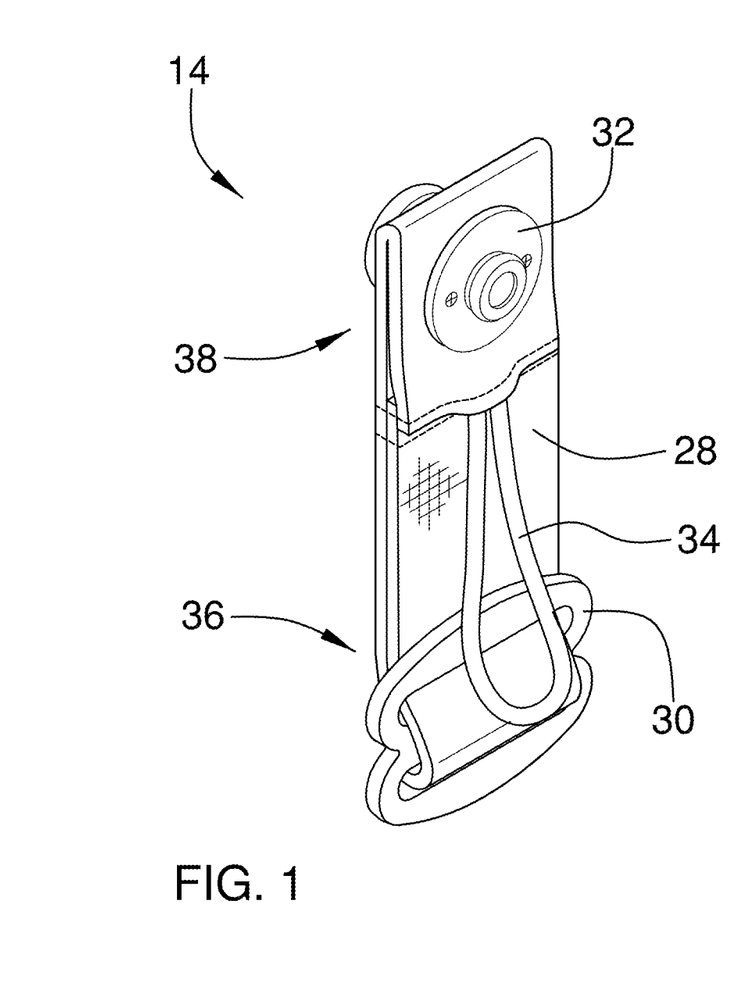
FIG. 1 is a first perspective view of a component of a connection assembly according to an embodiment of the disclosure.
Figure 2:
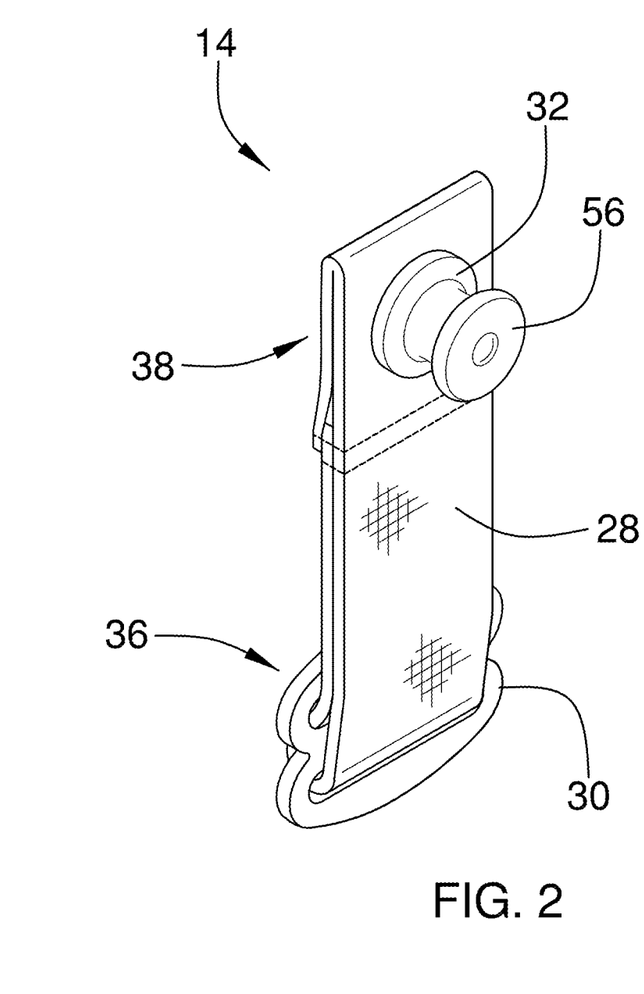
FIG. 2 is a second perspective view of the component of FIG. 1.
Figure 3:
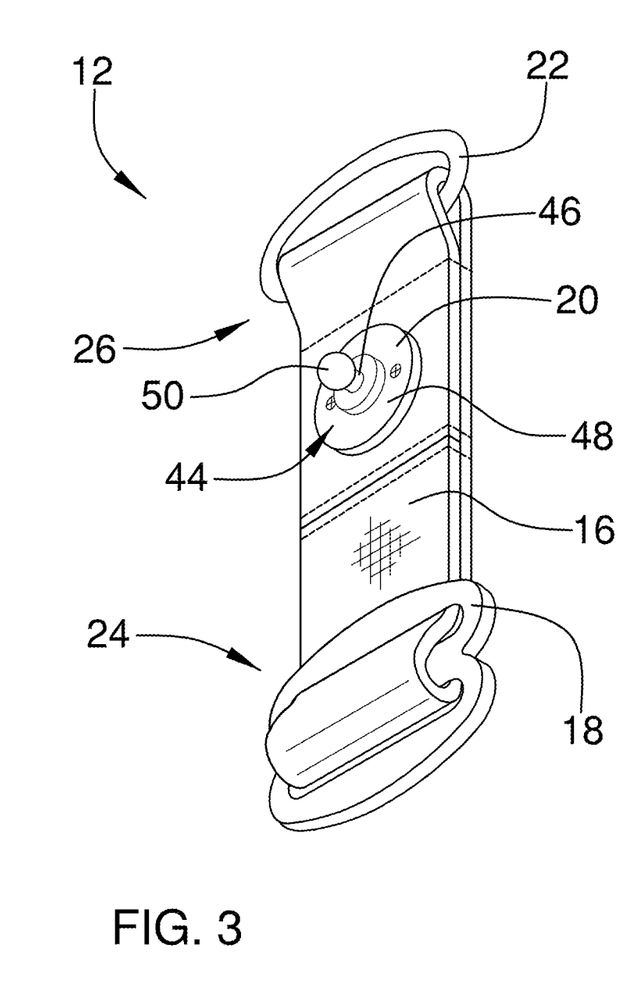
FIG. 3 is a first perspective view of another component of the connection assembly according to an embodiment of the disclosure.
Figure 4:
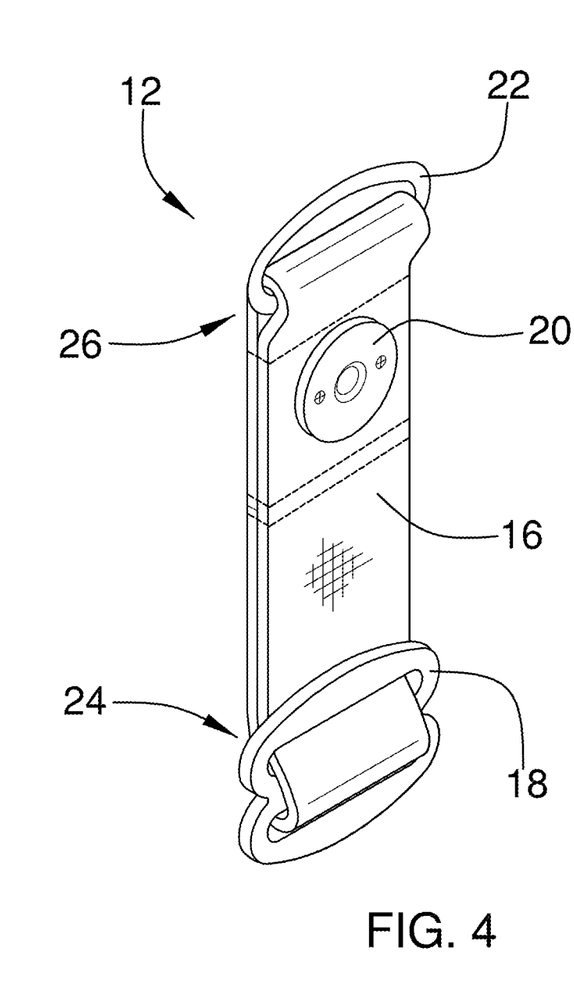
FIG. 4 is a second perspective view of the component of FIG. 3.

The connection assembly 10 includes a first attachment 12 and a second attachment 14. An exemplary embodiment of the first attachment 12 is shown in FIGS. 3 and 4, and an exemplary embodiment of the second attachment 14 is shown in FIGS. 1 and 2. However, it should be understood that the designation of the exemplary embodiment in FIGS. 1 and 2 as the "second attachment" and the designation of the exemplary embodiment in FIGS. 3 and 4 as the "first attachment" are for ease of reference and should not be considered as limiting the specification or the claims to only the exemplary embodiments shown. As shown in FIGS. 3 and 4, the first attachment 12 includes a first strap 16, a first panel 18, a first mating member 20, and a first loop 22. The first strap 16 has a first end 24 and a second end 26. The first panel 18 is attached to the first strap 16 adjacent to the first end 24 of the first strap 16. The first panel 18 is designed to releasably extend through a slot 74 positioned on the first article 70, as shown in FIG. 6. The first mating member 20 is attached to the first strap 16. The first loop 22 is attached to the first strap 16, wherein the first panel 18 is extendable through the first loop 22 to retain the first panel 18 and first mating member 20 in a static position relative to each other on the first article 70, as shown in FIG. 6. As shown in FIGS. 1 and 2, the second attachment 14 includes a second strap 28, a second panel 30, a second mating member 32, and a second loop 34. The second strap 28 has a first end 36 and a second end 38. The second panel 30 is attached to the second strap 28 adjacent to the first end 36 of the second strap 28. The second panel 30 is designed to releasably extend through the slot 74 positioned on the second article 72, as shown in FIG. 5. The second mating member 32 is attached to the second strap 28. The second loop 34 is attached to the second strap 28, wherein the second panel 30 is extendable through the second loop 34 to retain the second panel 30 and the second mating member 32 in a static position relative to each other on the second article 72. In the exemplary embodiment in FIGS. 5 and 6, there are multiple slots 74 on the first and second articles 70, 72 allowing multiple placements of the first and second attachments 10, 12.

With reference to FIGS. 1 through 4, the first loop 22 is attached to and projects from the second end 26 of the first strap 16, and the second loop 34 is attached to and projects from the second end 38 of the second strap 28. The first mating member 20 is attached to the first strap 16 adjacent the second end 26 thereof, and the second mating member 32 is attached to the second strap 28 adjacent the second end 38 thereof. Each of the first and second loops 22, 34 is made of a resiliently stretchable material, such as an elastic material or resiliently stretchable fabric. In another possible embodiment, the first and second loops 22, 34 could be made of other materials, such as fibrous cords or strings, metallic fibers, or textiles, which could be resiliently stretchable or not. The first mating member 20 and the second mating member 32 could be made of plastic or metallic materials or a combination thereof. The first and second loops 22, 34 can also be varied in length and attachment style and position. As shown, for example, in FIGS. 1 and 2, the second loop 34 extends over most of the length of the second strap 28 and is attached inside overlapping portions of the second strap 28. In contrast, for example, in FIGS. 3 and 4, the first loop 22 is shorter than the second loop 34 and is interlocked with the second end 38 of the second strap 28. However, these are merely exemplary embodiments and should not be considered as limiting the design of the first and second loops 22, 34, as different variations are within the scope of the disclosure.

With reference to FIGS. 5 and 6, each of the first and second straps 16, 28 is releasably extendable through the corresponding slot 74 positioned on each of the first article 70 and the second article 72 such that the first end 24, 36 and the second end 26, 38 project out of opposite slot ends 76, as best seen in FIG. 5, for example. As shown in FIGS. 5 and 6, when each of the first and second panels 18, 30 is extended through its corresponding first and second loop 22, 34, each of the first attachment 12 and the second attachment 14 is releasably attached around a piece of material 78 over the corresponding slot 74 positioned on each of the first article 70 and the second article 72. As shown in FIGS. 5 and 6, each of the first and second panels 18, 30 is sufficiently thin to extend through the corresponding slot 74 positioned on each of the first article 70 and the second article 72 and sufficiently long when pivoted to resist unintentional movement through the corresponding slot 74. To further explain, the first and second panels 18, 30, which in the exemplary embodiments are each essentially in the form of a buckle, are designed to fit through the slots 74 during installation. However, once the first and second panels 18, 30 are inserted through the slots 74, they can be pivoted such that if the second end 26, 38 is pulled, the first and second panels 18, 30 will be prevented or restricted from fitting back into the slot ends 76 due to the length of the first and second panels 18, 30 being greater than the height of the slot ends 76.

In the exemplary embodiment shown in FIGS. 1 through 4, the first and second panels 18, 30 can have a notched portion 40 designed to be engaged by the first and second loops 22, 34, respectively. For example, as shown in FIG. 5, the second panel 30 can be inserted completely through the second loop 34, such that the second loop 34 is positioned behind the second panel 30. In contrast, as shown in FIG. 6, the first strap 16 is essentially folded over on itself and the first panel 18 is inserted partially through the first loop 22, with the first loop 22 positioned around the middle of the first panel 18 in the notched portion 40. FIG. 6 also shows an unfolded first strap 16 in which the first panel 18 and first loop 22 are not engaged with one another. In a similar manner, FIG. 5 shows two of the second attachments 14, wherein the one on the left does not have the second loop 34 engaged with the second panel 30, while the one on the right has the second panel 30 extending through the second loop 34, such that the second loop 34 is retained behind or under the second panel 30.

Figure 7:
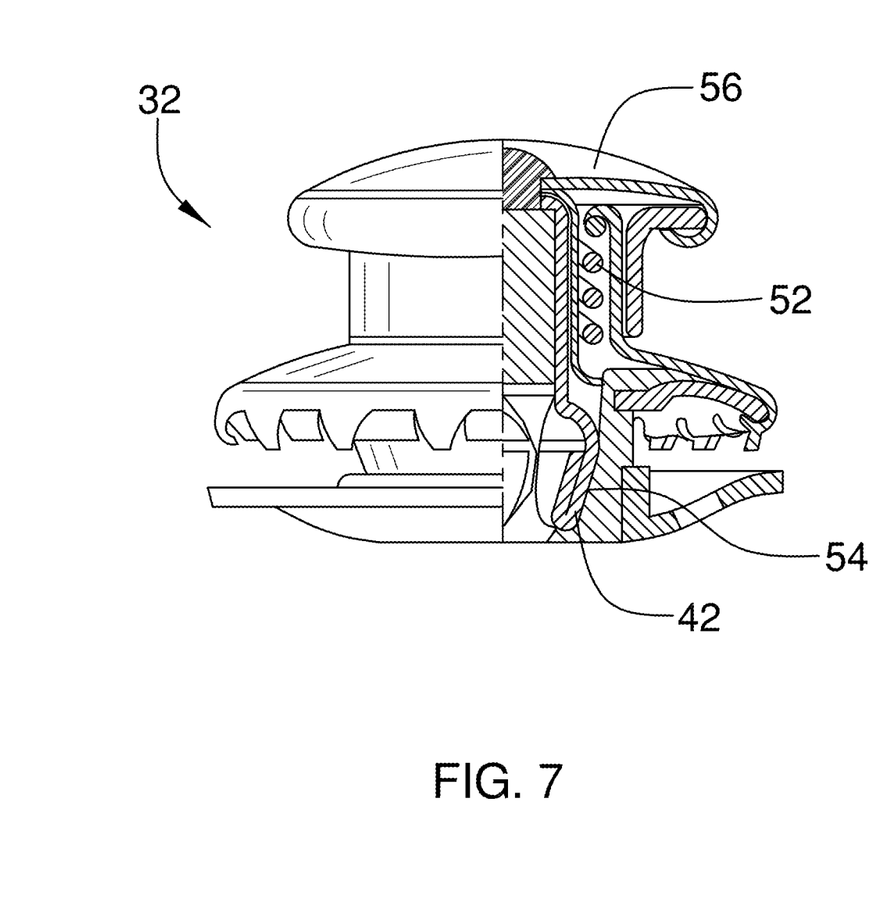
FIG. 7 is a partial cross-sectional side view of a component of an embodiment of the disclosure.

The first and second mating members 20, 32 are designed for a very secure but releasable connection to minimize or prevent accidental or inadvertent disconnection of the first and second mating members 20, 32, while also providing the user with ease of connection and disconnection of the first article 70 and the second article 72. An example of a possible design of the second mating member 32 that could be utilized in one possible embodiment is shown in FIG. 7, though it should be understood that this is an exemplary embodiment and should not be considered as limiting the claims or the specification to this particular design. As shown in FIG. 7, the second mating member 32 includes a clamping structure 42 that is selectively actuatable between an expanded position and a collapsed position. As shown in FIG. 3, the first mating member 20 includes a projecting structure 44 designed to be gripped by the clamping structure 42 when the clamping structure 42 is in the collapsed position. In the example shown, the projecting structure 44 includes a post 46 projecting from a base portion 48 and having a ball-shaped end 50, though other designs and shapes of the projecting structure 44 are within the scope of the disclosure.

In the example shown in FIG. 7, the second mating member 32 includes a spring 52 to exert a biasing force on the clamping structure 42 to hold the clamping structure 42 in the collapsed position. The clamping structure 42 is an expandable and contractable collet. The spring 52 passively biases the clamping structure 42 toward a tapered interior surface 54. Due to the tapered design, the interior surface 54 causes the clamping structure 42 to close or contract into the collapsed position shown in FIG. 7 when the clamping structure 42 is pushed toward and against the interior surface 54. The biasing force and contraction together cause the clamping structure 42 to lock or clamp securely onto the projecting structure 44, in this case the ball-shaped end 50. To release the clamping structure 42, a cap 56 is connected to the clamping structure 42. The cap 56 may be manually pulled out against the force of the spring 52 to move the clamping structure 42 away from the interior surface 54. The clamping structure 42 is thereby permitted to open up or expand into the expanded position. The clamping structure 42 can thus be voluntarily disengaged from the projecting structure 44. This design also allows for easy attachment, such as with only one hand. For example, when a user presses the second mating member 32 onto the first mating member 20, the clamping structure 42 is pressed against the projecting structure 44. Since the clamping structure 42 is currently in the collapsed position due to the biasing force of the spring 52, the ball-shaped end 50 cannot pass into the clamping structure 42 and instead abuts against the clamping structure 42. However, this abutment, combined with the user pressing the second mating member 32, causes the clamping structure 42 to be displaced against the biasing force of the spring 52, which thereby permits the clamping structure 42 to expand into the expanded position. The ball-shaped end 50 enters the clamping structure 42, at which point the abutment ends and the spring 52 forces the clamping structure 42 back into the collapsed position, but this time around the ball-shaped end 50 to produce a releasable clamping engagement. Again, the second mating member 32 shown in FIG. 7 and the first mating member 20 shown in FIG. 3 are one possible exemplary embodiment of a coupling system and should not be understood as limiting the connection assembly 10 to this particular design in the disclosure or in the claims.

While FIGS. 5 and 6 show one possible use of the connection assembly 10, many other uses are possible. In many jobs and recreational activities, users may desire or need to secure two articles together using connection assemblies that are easy to connect and disconnect, but which are also very secure and allow for customization of the arrangement of the articles. For example, in some outdoor, as well as indoor, jobs and activities, such as, but not limited to, military, forestry, construction, utility work, law enforcement, sports, hunting, camping, fishing, and climbing, users may be required to carry gear and equipment on their bodies, either attached to clothing or other gear and equipment. The equipment and gear can be quite varied and different placements can be useful depending on the job or activity. In addition, a secure connection is preferred where accidental disconnection of an article could be common and could result in loss of or damage to an article, such as in crowded areas or rugged terrain with multiple environmental objects, as well as for jobs and activities that involve substantial movement, such as riding, walking, running, and climbing. The connection assembly 10 can be used to provide such a secure and customizable connection for all sorts of articles in a variety of different jobs and activities.

FIGS. 8 through 18 show a second embodiment of a connection assembly 80 and a method of use in releasably coupling a first article to a second article. For clarity, different reference numerals will be used in describing this embodiment. However, some of the components of the connection assembly 80 and the related use are the same or similar to the components of the first embodiment of the connection assembly 10. Therefore, identical reference numerals may be used where appropriate for components that are identical in each of the connection assembly 10 and the connection assembly 80. It should also be understood that components or portions of any of the embodiments disclosed herein could be used or adapted for use in any other of the embodiments disclosed herein.

Figure 18:
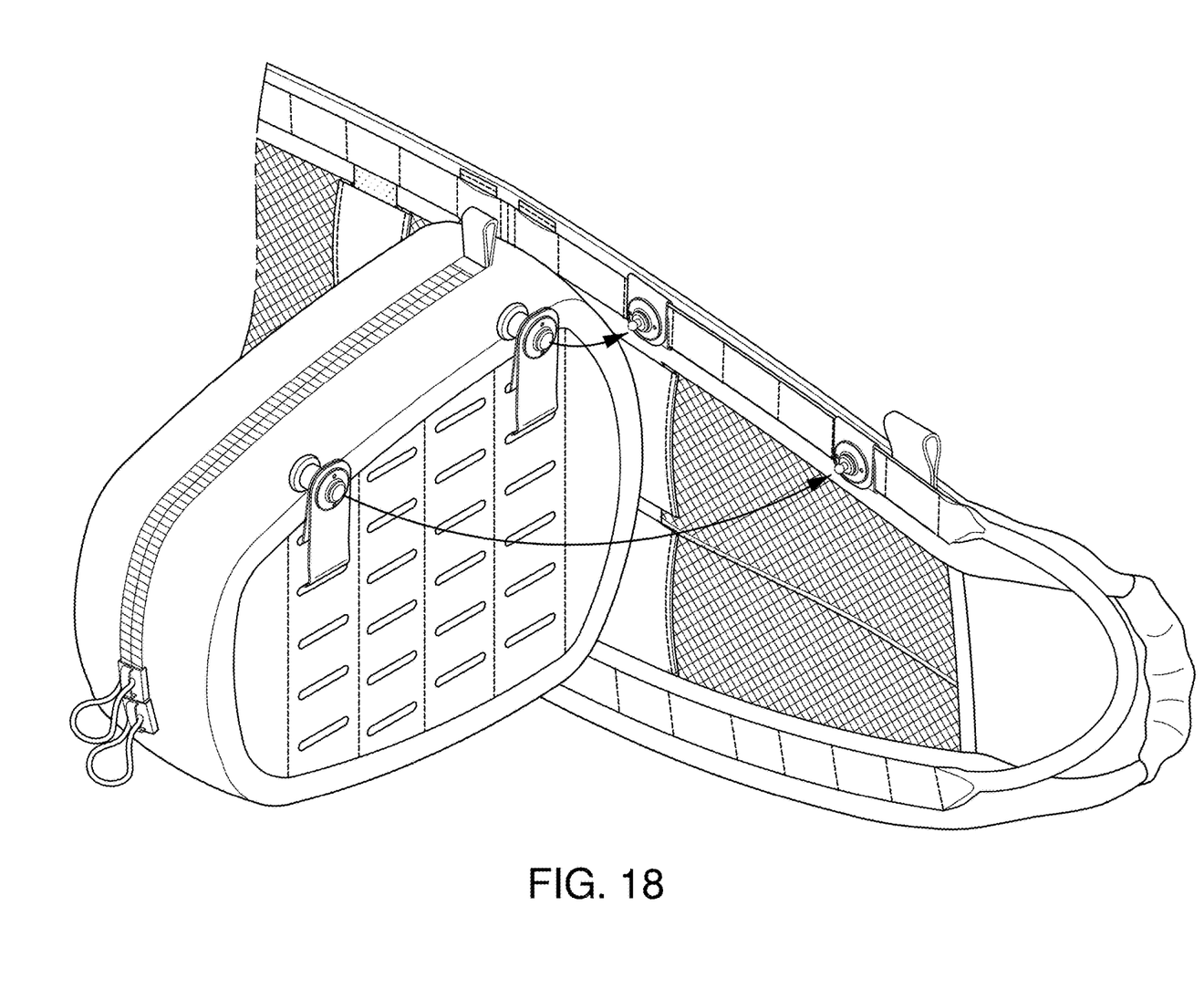
FIG. 18 is a perspective view of the connection assembly in FIG. 8 being used to connect the first article and the second article.

In addition, it should be noted that FIG. 18 shows the connection assembly 80 being used for releasably coupling an exemplary embodiment of the first article 70 to or with the second article 72. It should therefore be noted that FIG. 18 shows one possible use of the connection assembly 80 and should not be considered as limiting the claims or the disclosure to only this use. In the example shown, the first article 70 is in the form of a saddle used in saddle hunting, and the second article 72 is in the form of a pouch that can be detachably connected to the saddle. However, the first article 70 and the second article 72 as mentioned in the disclosure or the claims are not limited to these examples. Therefore, any reference in the specification or claims to a "first article" or a "second article" should be understood as referring to any type of articles, such as, but not limited to, devices, tools, packs, containers, equipment, gear, and clothing, that could be releasably coupled together by the connection assembly 80, and not merely the possible examples shown in FIG. 18.

Figure 8:
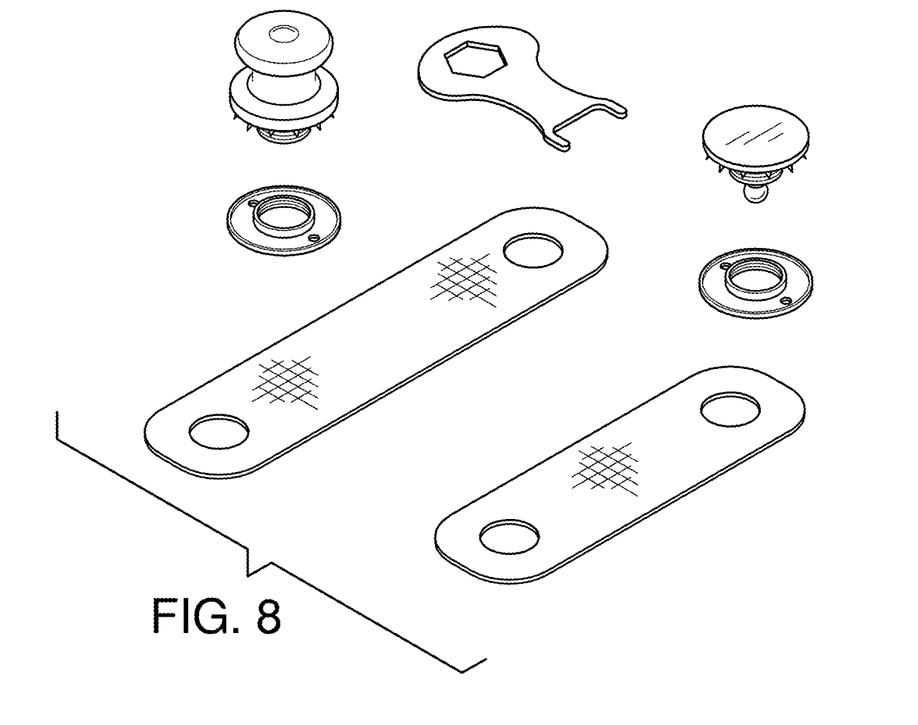
FIG. 8 is a top perspective view of a connection assembly according to a second embodiment of the disclosure.
Figure 9:
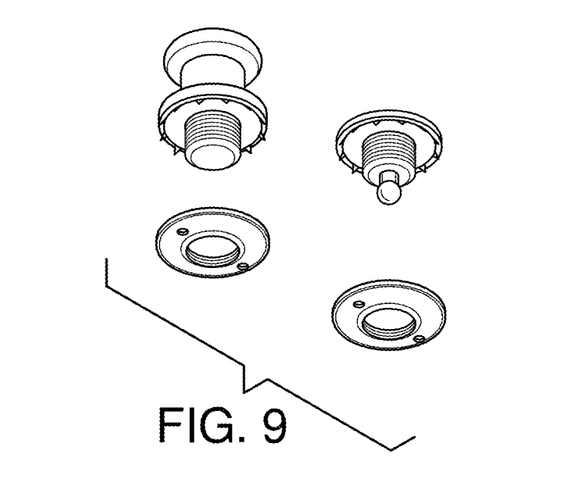
FIG. 9 is a bottom perspective view of components of the connection assembly in FIG. 8.
Figure 10:
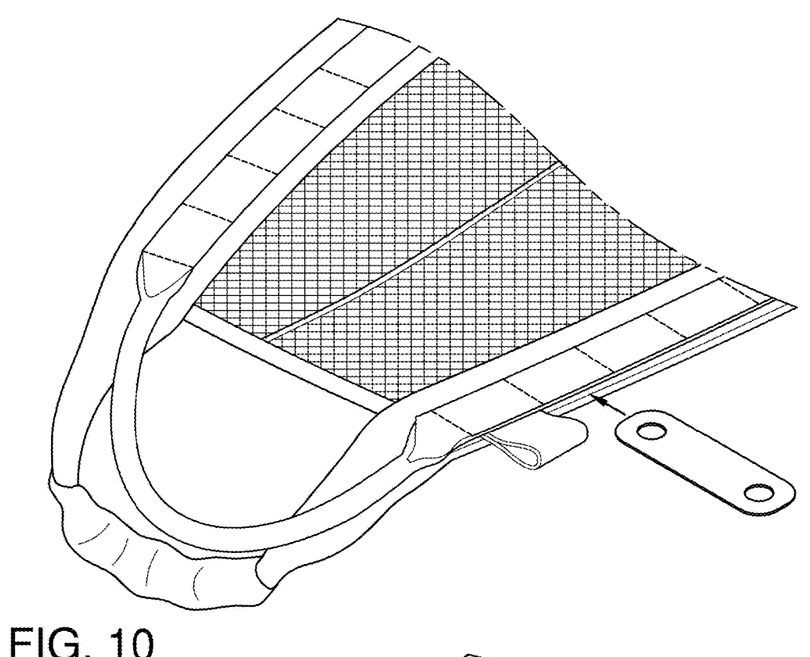
FIG. 10 is a perspective view of part of the connection assembly in FIG. 8 being installed on a first article.
Figure 11:
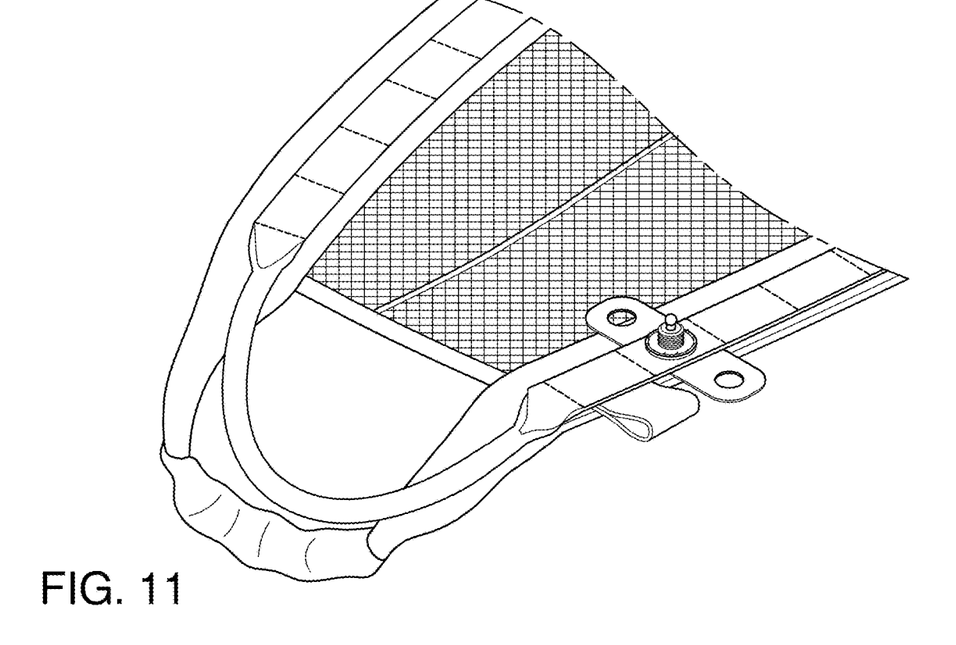
FIG. 11 is a perspective view of part of the connection assembly in FIG. 8 being installed on the first article.
Figure 12:
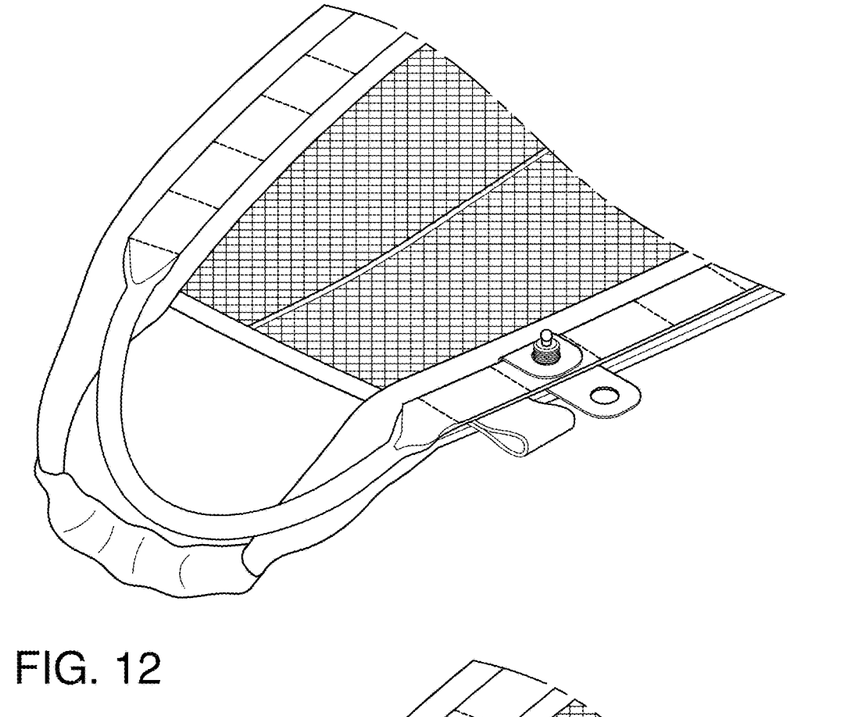
FIG. 12 is a perspective view of part of the connection assembly in FIG. 8 being installed on the first article.
Figure 13:
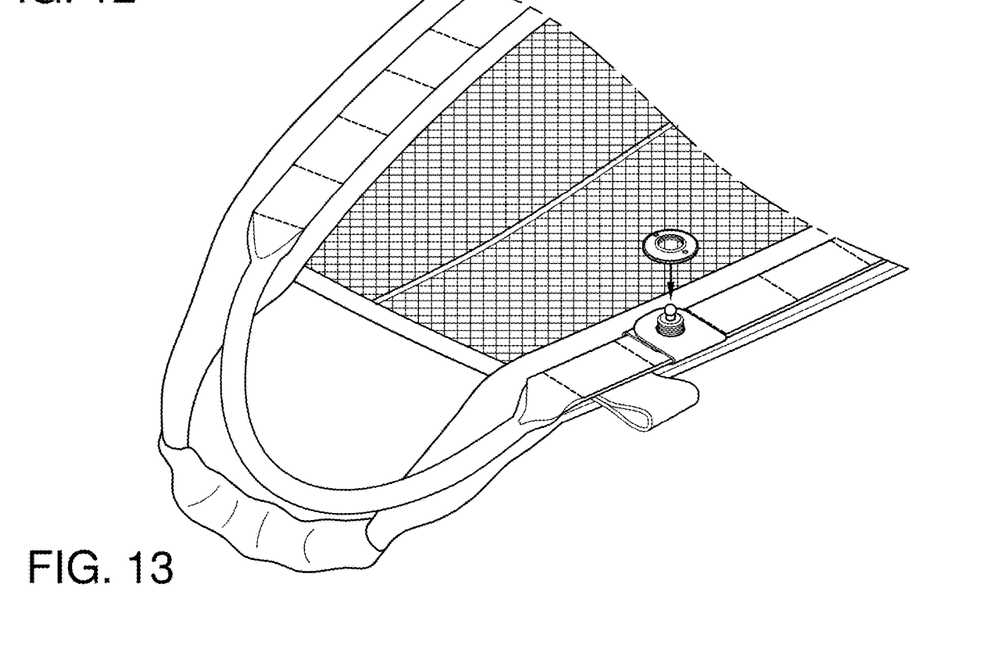
FIG. 13 is a perspective view of part of the connection assembly in FIG. 8 being installed on the first article.
Figure 14:
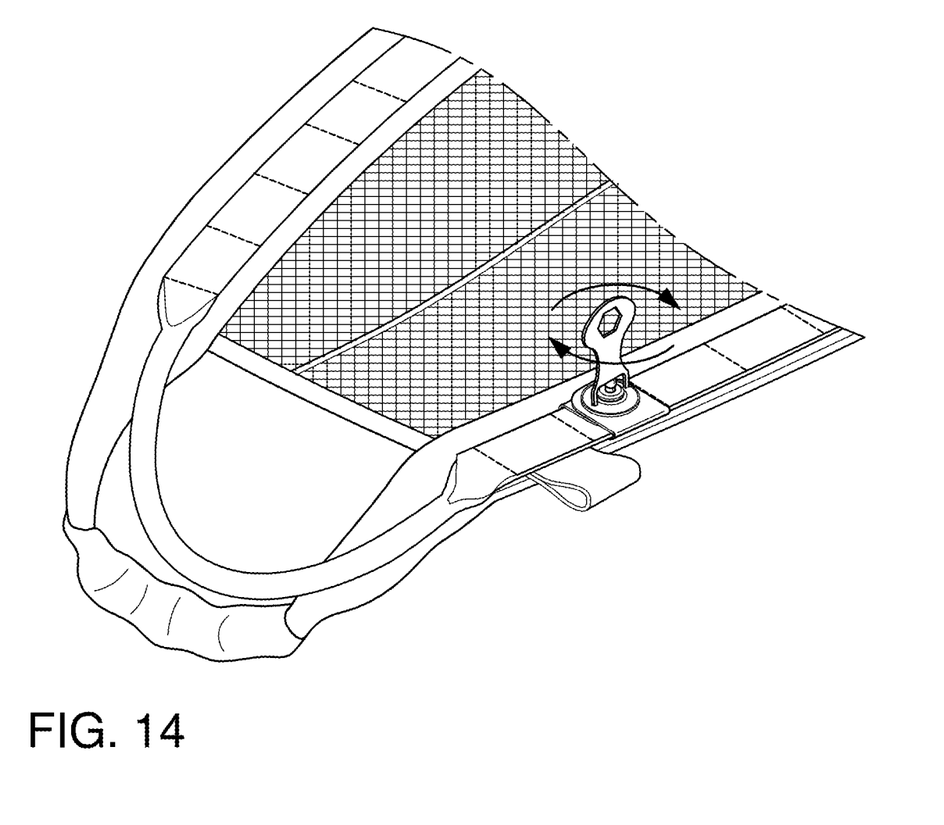
FIG. 14 is a perspective view of part of the connection assembly in FIG. 8 being installed on the first article.
Figure 15:
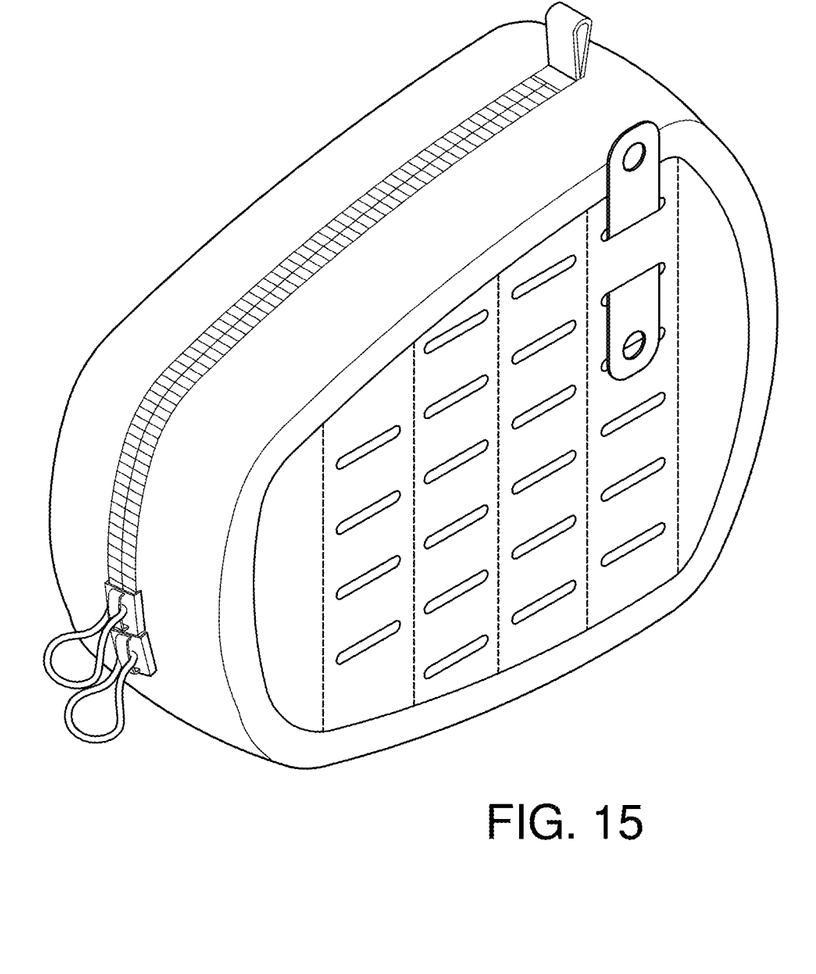
FIG. 15 is a perspective view of part of the connection assembly in FIG. 8 being installed on a second article.
Figure 16:
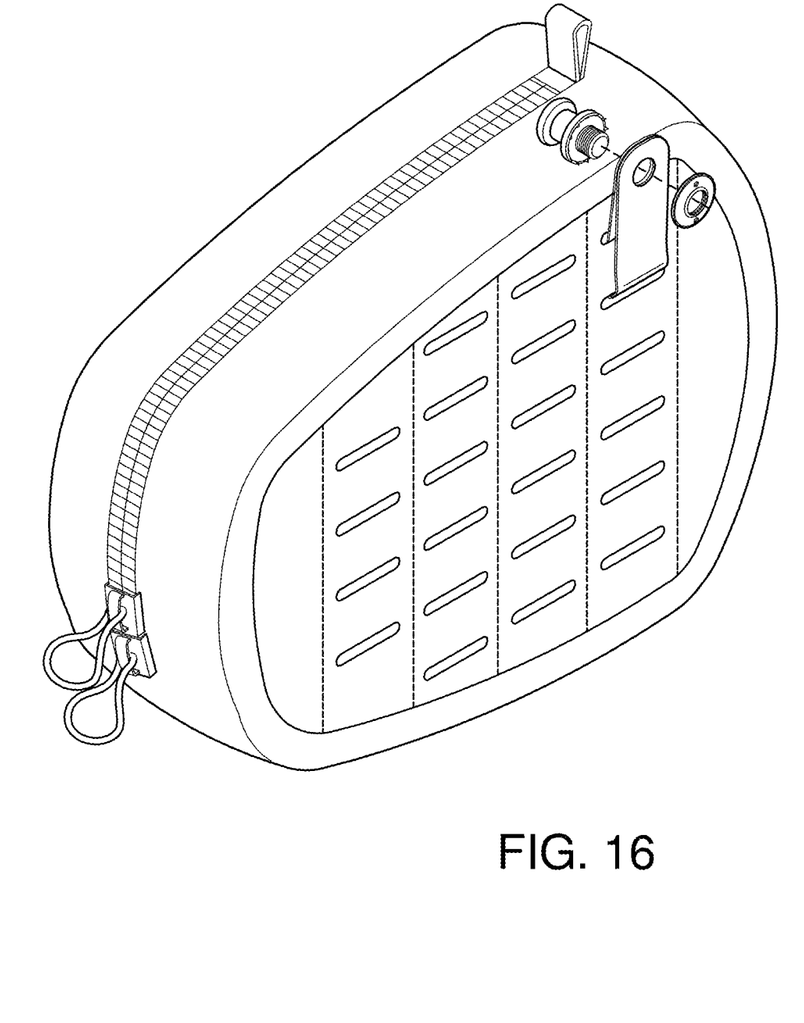
FIG. 16 is a perspective view of part of the connection assembly in FIG. 8 being installed on the second article.
Figure 17:
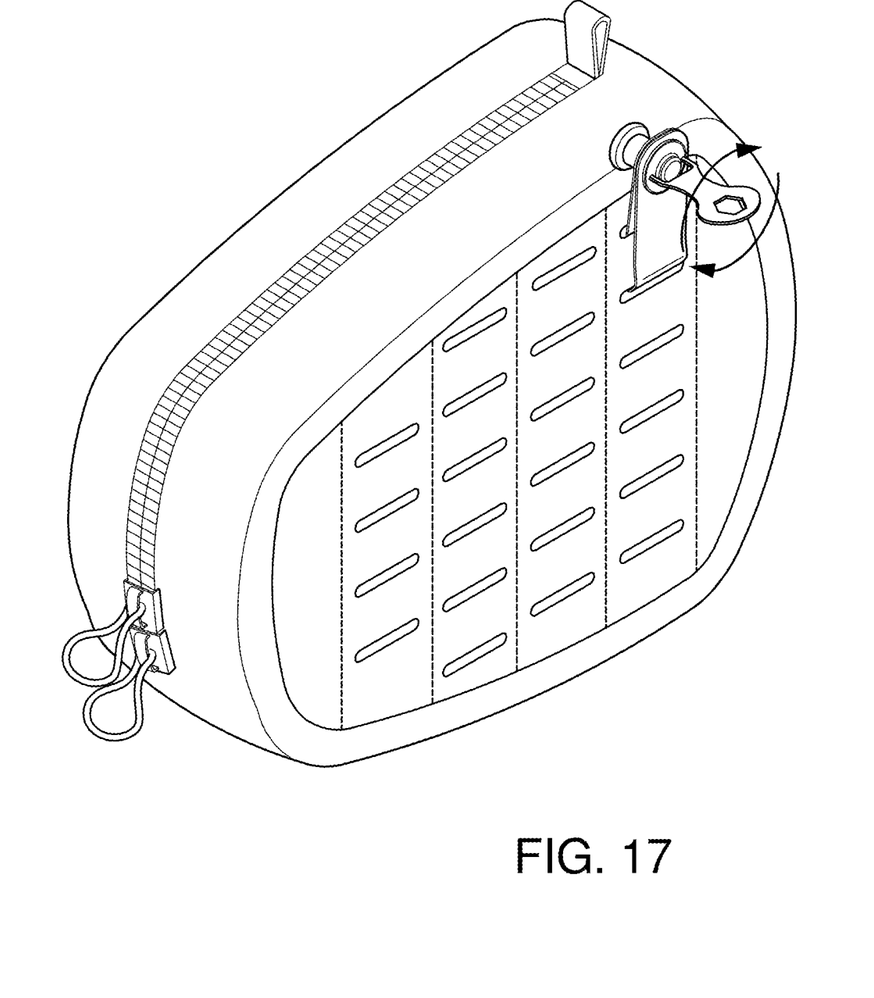
FIG. 17 is a perspective view of part of the connection assembly in FIG. 8 being installed on the second article.

As shown in FIGS. 8 and 9, the connection assembly 80 includes a first attachment strap 82, a first mating assembly 86, a second attachment strap 84, a second mating assembly 88, and a tool key 90. As shown in FIG. 10, the first attachment strap 82 is insertable through a loop 92 in the first article 70. As shown in FIGS. 12 and 13, the first attachment strap 82 is foldable around a section of the loop 92 in the first article 70. The first mating assembly 86 is positionable on opposing ends 96 of the first attachment strap 82. The first mating assembly 86 includes a rotatable portion 100. As shown in FIG. 14, the tool key 90 is designed to rotate the rotatable portion 100 of the first mating assembly 86 to secure the first mating assembly 86 to the opposing ends 96 of the first attachment strap 82. As shown in FIG. 15, the second attachment strap 84 is insertable through a loop 94 in the second article 72. As shown in FIG. 16, the second attachment strap 84 is foldable around a section of the loop 94 in the second article 72. The second mating assembly 88 is positionable on opposing ends 98 of the second attachment strap 84. The second mating assembly 88 includes a rotatable portion 102. As shown in FIG. 17, the tool key 90 is designed to rotate the rotatable portion 102 of the second mating assembly 88 to secure the second mating assembly 88 to the opposing ends 98 of the second attachment strap 84.

Each of the first attachment strap 82 and the second attachment strap 84 includes a pair of apertures 104 positioned one at each of the opposing ends 96, 98. The first mating assembly 86 includes a base portion 106 releasably couplable to the rotatable portion 100 of the first mating assembly 86. The base portion 106 of the first mating assembly 86 includes a projection 110 insertable through the pair of apertures 104 of the first attachment strap 82. The second mating assembly 88 includes a base portion 108 releasably couplable to the rotatable portion 102 of the second mating assembly 88. The base portion 108 of the second mating assembly 88 includes a projection 112 insertable through the pair of apertures 104 of the second attachment strap 84.

The projection 110 of the base portion 106 of the first mating assembly 86 includes a male threading 114. The rotatable portion 100 of the first mating assembly 86 includes a female threading 116 on an interior surface about an orifice 118. The female threading 116 of the first mating assembly 86 is designed to engage with the male threading 114 of the first mating assembly 86 to clamp the opposing ends 96 of the first attachment strap 82 between the base portion and the rotatable portion 100 of the first mating assembly 86. The projection 112 of the base portion 108 of the second mating assembly 88 includes a male threading 114. The rotatable portion 102 of the second mating assembly 88 includes a female threading 116 on an interior surface about an orifice 118. The female threading 116 of the second mating assembly 88 is designed to engage with the male threading 114 of the second mating assembly 88 to clamp the opposing ends 98 of the second attachment strap 84 between the base portion and the rotatable portion 102 of the second mating assembly 88.

The rotatable portion 100, 102 of each of the first mating assembly 86 and the second mating assembly 88 includes a pair of recesses 120. The tool key 90 includes a pair of prongs 122 designed to be inserted into the pair of recesses 120. This design of the tool key 90 and the corresponding design of the rotatable portion 100, 102 is only one exemplary embodiment. For example, the rotatable portion 100, 102 could have a pair of protrusions instead of the recesses 120 and the tool key 90 could have a corresponding pair of indentations that match the protrusions. In another possible embodiment, the rotatable portion 100, 102 could have a contoured surface like a square or hexagonal nut that would be engageable by a matching square or hexagonal wrench section of the tool key 90. In addition, the tool key 90 could have a flat handle portion as shown in the figures, or the tool key 90 could have a cylindrical or rounded handle for better gripping and torque.

In one possible embodiment, the first attachment strap 82 and the second attachment strap 84 can be made of natural or synthetic fabric, plastic, elastomer, cloth, or flexible metal, and can be made of different lengths, shapes, and sizes. The first mating assembly 86 and the second mating assembly 88 can be made of metal, plastic, rubber, elastomer, or a combination thereof.

The first mating assembly 86 and the second mating assembly 88 have the same or similar internal connection or lock design as shown in FIG. 7. Specifically, the second mating assembly 88 includes the clamping structure 42 designed to be selectively actuatable between an expanded position and a collapsed position. The second mating assembly 88 includes the spring 52 designed to exert a biasing force on the clamping structure 42 to hold the clamping structure 42 in the collapsed position. The first mating assembly 86 includes a projecting structure 124 extending out of the projection 112 of the base portion 108 of the second mating assembly 88. The projecting structure 124 is insertable through an opening 126 in the projection 112 of the base portion 108 of the second mating assembly 88 and into the clamping structure 42. The clamping structure 42 is designed to grip the projecting structure 124 when the clamping structure 42 is in the collapsed position. The clamping structure 42 includes an expandable and contractable collet, such as shown in FIG. 7.

As referenced above, FIGS. 10 through 18 show how the connection assembly 80 can be used to releasably couple the first article 70 to the second article 72. With reference to FIGS. 10 through 14, the first attachment strap 82 is inserted through a loop 92 in the first article 70. The first attachment strap 82 is then folded around a section of the loop 92 in the first article 70. The first mating assembly 86 is positioned on opposing ends 96 of the first attachment strap 82. A user then rotates the rotatable portion 100 of the first mating assembly 86 with the tool key 90 to secure the first mating assembly 86 to the opposing ends 96 of the first attachment strap 82. With reference to FIGS. 15 through 17, the second attachment strap 84 is inserted through a loop 94 in the second article 72. The second attachment strap 84 is folded around a section of the loop 94 in the second article 72. The second mating assembly 88 is positioned on opposing ends 98 of the second attachment strap 84. The user then rotates the rotatable portion of the second mating assembly 88 with the tool key 90 to secure the second mating assembly 88 to the opposing ends 98 of the second attachment strap 84. As shown in FIG. 18, the user then can releasably couple the first mating assembly 86 and the second mating assembly 88, thereby connecting the first article 70 and the second article 72.

To position the first mating assembly 86 on the first attachment strap 82, the user inserts the projection 110 of the base portion 106 of the first mating assembly 86 through the pair of apertures 104 positioned one at each of the opposing ends 96 of the first attachment strap 82. This process is shown in steps in FIGS. 11 through 13, wherein the first mating assembly 86 is placed on the loop 92, then one end of the first attachment strap 82 is folded over so that the projection 110 can be inserted through the one of the pair of apertures 104, and then the other end of the first attachment strap 82 is folded over so that the projection 110 can also be inserted through the other of the pair of apertures 104. The male threading 114 on the projection 110 of the base portion 106 of the first mating assembly 86 is then engaged with the female threading 116 on the interior surface about the orifice 118 in the rotatable portion 100 of the first mating assembly 86, which thereby clamps the opposing ends 96 of the first attachment strap 82 between the base portion and the rotatable portion 100 of the first mating assembly 86. The tool key 90 is used to screw the rotatable portion 100 together with the base portion 106 of the first mating assembly 86, as shown in FIG. 14. As discussed above, the rotation of the rotatable portion 100 is accomplished by inserting the prongs 122 of the tool key 90 into the pair of recesses 120 in the rotatable portion 100 and turning the tool key 90.

To position the second mating assembly 88 on the second attachment strap 84, the process is similar but slightly different. Instead of folding each of the opposing ends 98, the second attachment strap 84 is folded once to align the pair of apertures 104 on the opposing ends 98, as shown in FIG. 16, such that the second article 72 can be suspended from the second mating assembly 88. The user then inserts the projection 112 of the base portion 108 of the second mating assembly 88 through the pair of apertures 104. The male threading 114 on the projection 112 of the base portion 108 of the second mating assembly 88 is then engaged with the female threading 116 on the interior surface about the orifice 118 in the rotatable portion of the second mating assembly 88, which thereby clamps the opposing ends 98 of the second attachment strap 84 between the base portion and the rotatable portion of the second mating assembly 88. The tool key 90 is also used here to screw the rotatable portion together with the base portion 106 of the first mating assembly 86, as shown in FIG. 17.

In order to releasably couple the exemplary embodiment of the first mating assembly 86 and the second mating assembly 88 together, the user first expands the clamping structure 42 of the second mating assembly 88, specifically by pulling back on the cap 56. The user then places the projecting structure 124, in this case similar to the post 46, extending out of the projection 110 of the base portion 106 of the first mating assembly 86 through the opening 126 in the projection 112 of the base portion 108 of the second mating assembly 88 and into the clamping structure 42. The user then releases the cap 56, which allows the clamping structure 42 to collapse and thereby grip the projecting structure 124.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A method of releasably coupling a first article to a second article, said method comprising the steps of:
inserting a first attachment strap through a loop in a first article;
folding said first attachment strap around a section of said loop in said first article;
positioning a first mating assembly on opposing ends of said first attachment strap;
rotating a rotatable portion of said first mating assembly to secure said first mating assembly to said opposing ends of said first attachment strap;
inserting a second attachment strap through a loop in a second article;
folding said second attachment strap around a section of said loop in said second article;
positioning a second mating assembly on opposing ends of said second attachment strap;
rotating a rotatable portion of said second mating assembly to secure said second mating assembly to said opposing ends of said second attachment strap; and
releasably coupling said first mating assembly and said second mating assembly.

2. The method of claim 1, wherein:
said step of rotating said rotatable portion of said first mating assembly is performed using a tool key; and
said step of rotating said rotatable portion of said second mating assembly is performed using said tool key.

3. The method of claim 2, wherein:
said step of positioning said first mating assembly includes inserting a projection of a base portion of said first mating assembly through a pair of apertures positioned one at each of said opposing ends of said first attachment strap; and
said step of positioning said second mating assembly includes inserting a projection of a base portion of said second mating assembly through a pair of apertures positioned one at each of said opposing ends of said first attachment strap.

4. The method of claim 3, wherein:
said step of positioning said first mating assembly includes engaging a male threading on said projection of said base portion of said first mating assembly with a female threading on an interior surface about an orifice in said rotatable portion of said first mating assembly, and thereby clamping said opposing ends of said first attachment strap between said base portion and said rotatable portion of said first mating assembly; and
said step of positioning said second mating assembly includes engaging a male threading on said projection of said base portion of said second mating assembly with a female threading on an interior surface about an orifice in said rotatable portion of said second mating assembly, and thereby clamping said opposing ends of said second attachment strap between said base portion and said rotatable portion of said second mating assembly.

5. The method of claim 4, wherein:
said step of rotating said rotatable portion of said first mating assembly with a tool key includes inserting a pair of prongs of said tool key into a pair of recesses in said rotatable portion of said first mating assembly and turning said tool key; and
said step of rotating said rotatable portion of said second mating assembly with a tool key includes inserting a pair of prongs of said tool key into a pair of recesses in said rotatable portion of said second mating assembly and turning said tool key.

6. The method of claim 5, wherein said step of releasably coupling said first mating assembly and said second mating assembly includes:
expanding a clamping structure of said second mating assembly;
placing a projecting structure extending out of said projection of said base portion of said first mating assembly through an opening in said projection of said base portion of said second mating assembly and in said clamping structure; and
collapsing said clamping structure and thereby gripping said projecting structure.

7. The method of claim 6, wherein said first article is a hunting saddle and said second article is an item of outdoor equipment.

8. The method of claim 2, wherein:
said step of rotating said rotatable portion of said first mating assembly with a tool key includes inserting a pair of prongs of said tool key into a pair of recesses in said rotatable portion of said first mating assembly and turning said tool key; and
said step of rotating said rotatable portion of said second mating assembly with a tool key includes inserting a pair of prongs of said tool key into a pair of recesses in said rotatable portion of said second mating assembly and turning said tool key.

9. The method of claim 1, wherein:
said step of positioning said first mating assembly includes inserting a projection of a base portion of said first mating assembly through a pair of apertures positioned one at each of said opposing ends of said first attachment strap; and
said step of positioning said second mating assembly includes inserting a projection of a base portion of said second mating assembly through a pair of apertures positioned one at each of said opposing ends of said first attachment strap.

10. The method of claim 9, wherein:
said step of positioning said first mating assembly includes engaging a male threading on said projection of said base portion of said first mating assembly with a female threading on an interior surface about an orifice in said rotatable portion of said first mating assembly, and thereby clamping said opposing ends of said first attachment strap between said base portion and said rotatable portion of said first mating assembly; and
said step of positioning said second mating assembly includes engaging a male threading on said projection of said base portion of said second mating assembly with a female threading on an interior surface about an orifice in said rotatable portion of said second mating assembly, and thereby clamping said opposing ends of said second attachment strap between said base portion and said rotatable portion of said second mating assembly.

11. The method of claim 10, wherein said step of releasably coupling said first mating assembly and said second mating assembly includes:
expanding a clamping structure of said second mating assembly;
placing a projecting structure extending out of said projection of said base portion of said first mating assembly through an opening in said projection of said base portion of said second mating assembly and in said clamping structure; and
collapsing said clamping structure and thereby gripping said projecting structure.

12. The method of claim 1, wherein said first article is a hunting saddle and said second article is an item of outdoor equipment.

* * * * *